United States Patent
McCartney

(10) Patent No.: US 10,205,855 B2
(45) Date of Patent: Feb. 12, 2019

(54) SYSTEM AND METHOD OF IMPROVING AUDIO TIME STRETCHING USING TIMELINE

(71) Applicant: Apple Inc., Cupertino, CA (US)

(72) Inventor: James E. McCartney, San Jose, CA (US)

(73) Assignee: Apple Inc., Cupertino, CA (US)

(*) Notice: Subject to any disclaimer, the term of this patent is extended or adjusted under 35 U.S.C. 154(b) by 1151 days.

(21) Appl. No.: 14/292,764

(22) Filed: May 30, 2014

(65) Prior Publication Data
US 2015/0350494 A1 Dec. 3, 2015

(51) Int. Cl.
*H04N 5/04* (2006.01)
*G10L 21/043* (2013.01)
*G11B 27/00* (2006.01)

(52) U.S. Cl.
CPC ............. *H04N 5/04* (2013.01); *G10L 21/043* (2013.01); *G11B 27/005* (2013.01)

(58) Field of Classification Search
CPC ....................................................... G10L 21/04
USPC .......................................... 386/200; 704/503
See application file for complete search history.

(56) References Cited

U.S. PATENT DOCUMENTS

| 7,676,142 B1 * | 3/2010 | Hung .................. G11B 27/005 348/446 |
| 8,295,687 B1 | 10/2012 | Kuspa |
| 2011/0154199 A1 | 6/2011 | Maffitt et al. |

OTHER PUBLICATIONS

Innovation Plus ip.com See Search Result 1-6, Mar. 16, 2005.*

* cited by examiner

*Primary Examiner* — William C Vaughn, Jr.
*Assistant Examiner* — Daniel T Tekle
(74) *Attorney, Agent, or Firm* — Womble Bond Dickinson (US) LLP

(57) ABSTRACT

Method for improving audio time stretching starts with processor receiving input media file and rate schedule. Rate schedule includes identification of portions of input media file and playback output rates associated with each of the portions of input media file. Writer thread being executed by processor generates timeline that is linked list including segments that respectively represent portions of input media file and associated playback output rates as desired playback rate curves. Generating timeline include writing each segment in linked list to end of linked list. Processor then performs time scaling of media file based on rate schedule to generate output media file. Performing time scaling of media file includes identifying by reader thread being executed by processor a segment in timeline corresponding to desired output time, and translating by reader thread desired output time to corresponding input time based on identified segment. Other embodiments are described.

25 Claims, 10 Drawing Sheets

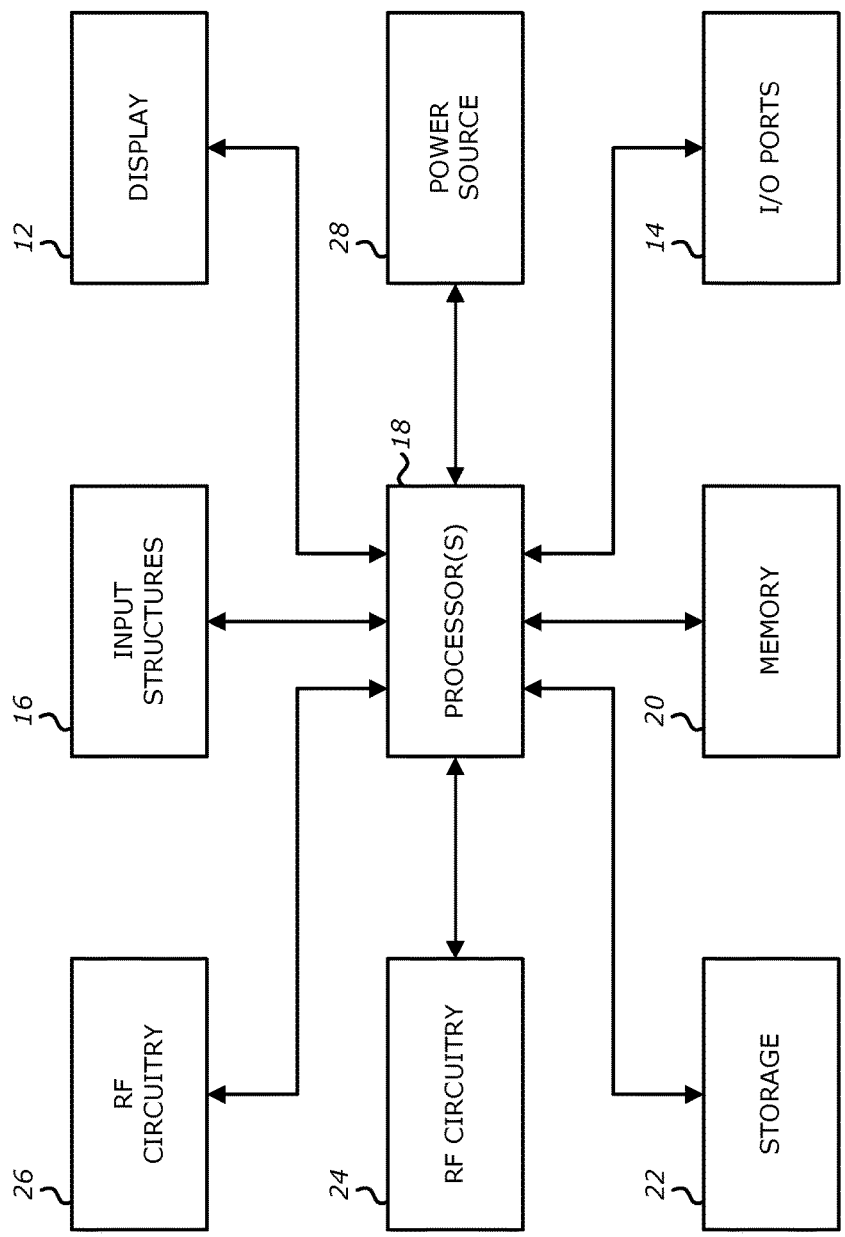

SYSTEM AND METHOD OF IMPROVING AUDIO TIME STRETCHING USING TIMELINE

FIELD

An embodiment of the invention relate generally to systems and methods of improving audio time stretching for audio content for playback by an electronic device (e.g., mobile device) by using a timeline to precisely translate the time between the input media and the output media in accordance with the desired output playback rate. The timeline provides a precise relation between the input media and the output media such that the time stretching may be sample accurate. Specifically, the timeline may include segments representing portions of the media file and the desired output playback rate associated with the portions, respectively. The timeline is thread-safe such that the segments may be added during playback. Further, the timeline may also support different time stretching algorithms.

BACKGROUND

During editing of audio-visual content, portions of the visual content can be altered to be played back in slow motion. The portions that are in slow motion will appear as though time has slowed down. Similarly, during editing, portions of the visual content can also be made to appear as though time has sped up. In order create this effect in filmmaking, the frames included in the visual content are displayed at different rates.

While this process of changing the rate of displaying the visual content is mechanical and thus, simple to implement, the same cannot be said for the changing the play rate of the audio content ("time stretching"). For instance, current time stretching algorithms may introduce a latency that renders the synchronization of the rate-changed audio signal and rate-changed video signal to be difficult.

SUMMARY

Generally, the invention relates to improving the timing accuracy of the audio time stretching of a media file in which portions of the media file are to be played back at different output playback rate. Accordingly, while the invention may be used with audio-visual content, the invention may also be used with audio content alone.

In one embodiment, a method for improving audio time stretching starts with a processor receiving an input media file and a rate schedule. The rate schedule includes an identification of portions of the input media file and playback output rates associated with each of the portions of the input media file. A writer thread being executed by the processor generates a timeline that is a linked list including a plurality of segments. The segments respectively represent the portions of the input media file and the associated playback output rates as desired playback rate curves. Each segment may include an input start time and an input end time. In some embodiments, generating the timeline may include writing a new segment in the linked list by appending the new segment to the end of the linked list during or before playback. In some embodiments, appending the new segment to the end of the linked list includes appending the new segment after a segment pointed to by a tail pointer of the writer thread. The method may then proceed with a processor performing a time scaling of the media file based on the rate schedule to generate an output media file. In some embodiments, performing time scaling of the media file includes identifying by a reader thread being executed by the processor a segment in the timeline corresponding to a desired output time, and translating by the reader thread the desired output time to the corresponding input time based on the identified segment. In some embodiments, generating the timeline includes the writer thread deleting segments before the segment pointed to by a head pointer of the reader.

In one embodiment, a non-transitory storage medium device having stored thereon instructions, when executed by a processor, causes the processor to perform a method for improving audio time stretching.

In one embodiment, a system for improving audio time stretching includes a communication interface, a processor, and a memory storage. The communication interface may receive an input media file and a rate schedule. The rate schedule includes an identification of portions of the input media file and playback output rates associated with each of the plurality of portions of the input media file. The memory storage may store instructions that, when executed by the processor causes the processor to execute a writer thread to generate a timeline that is a linked list including segments. The segments respectively represent the portions of the input media file and the associated playback output rates as desired playback rate curves. Generating the timeline by the writer thread may include writing a new segment in the linked list by appending the new segment to the end of the linked list before or during playback. The memory storage may also store instructions that, when executed by the processor causes the processor to perform a time scaling of the media file based on the rate schedule to generate an output media file. In some embodiments, performing time scaling of the media file includes executing a reader thread to identify a segment in the timeline corresponding to a desired output time, and to translate the desired output time to the corresponding input time based on the identified segment.

The above summary does not include an exhaustive list of all aspects of the present invention. It is contemplated that the invention includes all systems, apparatuses and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings:

FIG. 6 is a block diagram of exemplary components of an electronic device detecting a user's voice activity in accordance with aspects of the present disclosure.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

Figure 1:
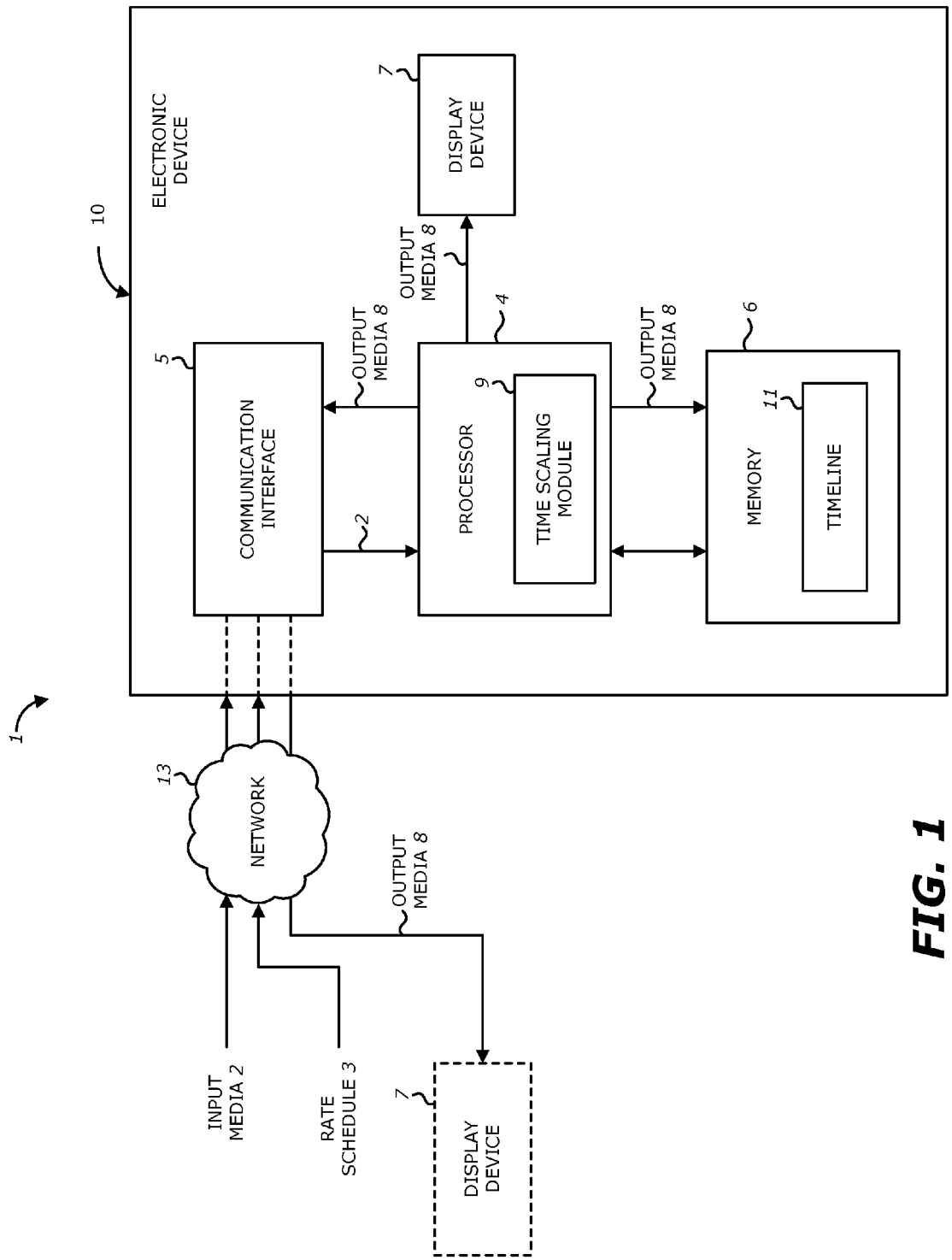
FIG. 1 illustrates a block diagram of a system for improving audio time stretching according to an embodiment of the invention.

FIG. 1 illustrates a block diagram of a system for improving audio time stretching according to an embodiment of the invention. As shown in FIG. 1, the system 1 includes a consumer electronic device 10 such as smart phone, tablet, or computer receiving an input media 2 and a rate schedule 3. In some embodiments, the system 1 may be a networked system that includes the consumer electronic device 10 coupled to a server (not shown) via a trusted and/or untrusted network 13 to receive the content (e.g., input media 2, rate schedule 3). The network 13 may be a cellular mobile phone network (e.g. a Global System for Mobile communications, GSM, network), including current 2G, 3G and 4G networks and their associated call and data protocols; and an IEEE 802.11 data network (WiFi or Wireless Local Area Network, WLAN).

The electronic device 10 may include a communication interface 5, a processor 4, a memory device 6 and a display device 7. In one embodiment, the communication interface 5 may be an interface that is coupled to the network 13 in order to receive the input media 2 and the rate schedule 3. The input media (or input media file) 2 may be audio, visual, or audio-visual data. The rate schedule 3 may include an identification of portions of the input media 2 and the playback output rates associated with each of the portions of the input media file. The playback output rate may be the rate at which each portion is desired to be played back to the user. The rate may be defined as the number of seconds of input media time per seconds of presentation (e.g., output media 8) rate. For instance, an input media file may be a movie and the rate schedule 3 may delineate that, for the portion of the input media file between times 0 seconds and 1 second, the desired playback output rate is 2 (e.g., number of seconds of input media/number of seconds of output media file 8. In one embodiment, the rate schedule 3 is included in the input media 2. In another embodiment, the rate schedule is separate from the input media 2 and received from another location. For instance, the rate schedule may be inputted by the user via a user interface of the electronic device 10.

As shown in FIG. 1, the memory storage 6 is coupled to the communication interface 5 and stores, for example, the input media 2 and rate schedule 3 received by the communication interface 5 and output media 8 and a timeline 11, as further described below. The memory storage 6 may include one or more different types of storage such as hard disk drive storage, nonvolatile memory, and volatile memory such as dynamic random access memory.

Referring to FIG. 1, the processor 4 may be coupled to the communication interface 5 and the memory storage 6. The processor 4 may be a microprocessor, a microcontroller, a digital signal processor, or a central processing unit. The term "processor" may refer to a device having two or more processing units or elements, e.g. a CPU with multiple processing cores. The processor 4 may be used to control the operations of the electronic device 10 by executing software instructions or code stored in the storage 6. As shown in FIG. 1, the processor 4 may also include a time scaling module 9 that is controlled by the processor 4 by executing software instructions or code stored in the storage 6. For instance, via the time scaling module 9, the processor 4 may executing software instructions or code stored in the storage 6 that causes the time scaling module 9 to perform a method for improving audio time stretching according to an embodiment of the invention. Moreover, as shown in FIG. 1, the processor 4 is coupled to the communication interface 5 and receives the input media 2 from the communication interface 5. In some embodiments, once the processor 4 generates the output media file 8 (as further described below), the processor 4 may transmit the output media file 8 to a display device 7 (e.g., display screen) that is internal to the electronic device 10 to be displayed, to the communication interface 5 to be transmitted via the network 13 to a display device 7 (e.g., television, computer display, etc.) that is external to the electronic device 10 to be displayed, and/or to the memory device 6 to be stored.

Figure 2:
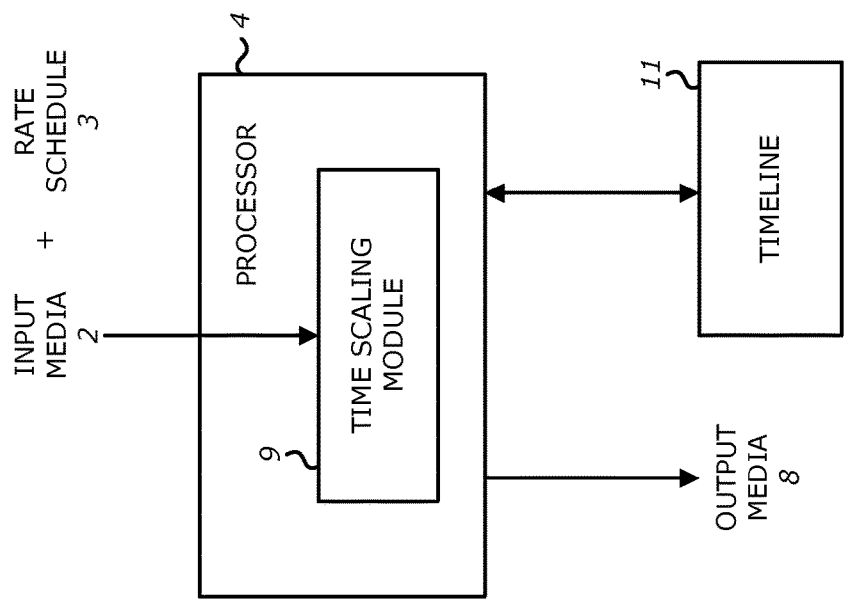
FIG. 2 is a block diagram illustrating the details of the system for improving audio time stretching according to an embodiment of the invention.
Figure 4:
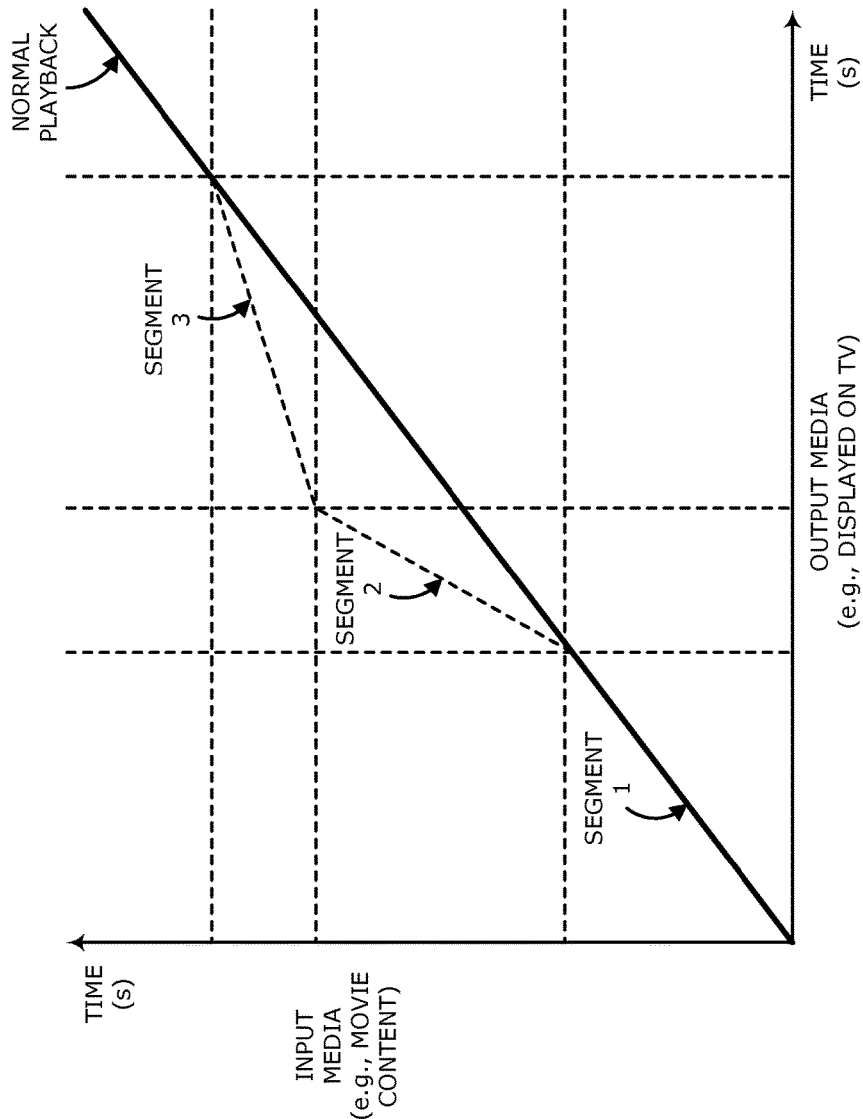
FIG. 4 is a graph of the relationship between a playback rate of the input media and the playback rate of the output media and includes an illustration the segments included in the timeline according to an embodiment of the invention.

In FIG. 2, the details of the system 2 for improving audio time stretching according to an embodiment of the invention are illustrated. The input media 2 (e.g., film, music, speech recording, etc.) is an audio, visual, or audio-visual file that is received by the processor 4 or the time scaling module 9 included therein. For example, the input media 2 may be a movie file in its original format. The processor 4 may also receive the along with the input media 2 a rate schedule 3 that delineate that portions of the input media file 2 are desired to be played back at a rate that is different from the rate in its original format. In some embodiments, the rate schedule 3 may be a table delineating a plurality of time frames that identify portions of the input media 2 and the associate output playback rate that is desired. For example, each portion of the input media 2 may be identified by the input start time and the input end time (e.g., times 0 to 10 s of the input media file 2) and the desired output playback rate (e.g., rate=2 which is 2 times faster than the rate in the original format). Referring to FIG. 4, a graph of the relationship between a playback rate of the input media 2 and the playback rate of the output media according to an embodiment of the invention is illustrated. The y-axis of the graph in FIG. 4 represents the time (e.g., seconds) of the content of input media (e.g., the movie in original format). The x-axis of the graph in FIG. 4 represents the time (e.g., seconds) of the content of output media (e.g., the movie including time stretching delineated in the rate schedule). The normal playback of the input media 2 at constant rate 1 is illustrated by constant diagonal line. In FIG. 4, segment 1 is a desired playback output rate of 1. Each segment of the graph illustrates a portion of the input (and output) media file that is being played back at a given rate. For instance, segment 2 illustrates a desired playback output rate being higher than 1 such that that portion of input content will be played back at a faster rate in the output media that in the input media. For instance, if the desired playback output rate is 5, there will be the same amount of input content being played back in 5 seconds of input content playback time will be played back in 1 second of output content. Further, segment 3 as illustrated in FIG. 4 shows a desired output playback rate that is lower than 1 such that that portion of input content will be played back at a slower rate in the output media that in the input media (e.g., slow motion). In segment 3, for instance, if the desired playback output rate is 0.5, there will be the same amount of input content being played back in 1 second of input content playback time will be played back in 2 seconds of output content. While in FIG. 4, the rates are shown as constant rate, the rates can also be exponential, a ramp, a sinusoidal curve, a parabolic curve or otherwise varying. It is understood that rate curve may take on any shaped curve. Furthermore, the points on the output media file 8 (e.g., x-axis) are calculated such that the area under the curve for a segment on the x-axis (e.g., portion of time on the x-axis covered by a segment being outputted) equals the duration of the input segment.

Figure 3:
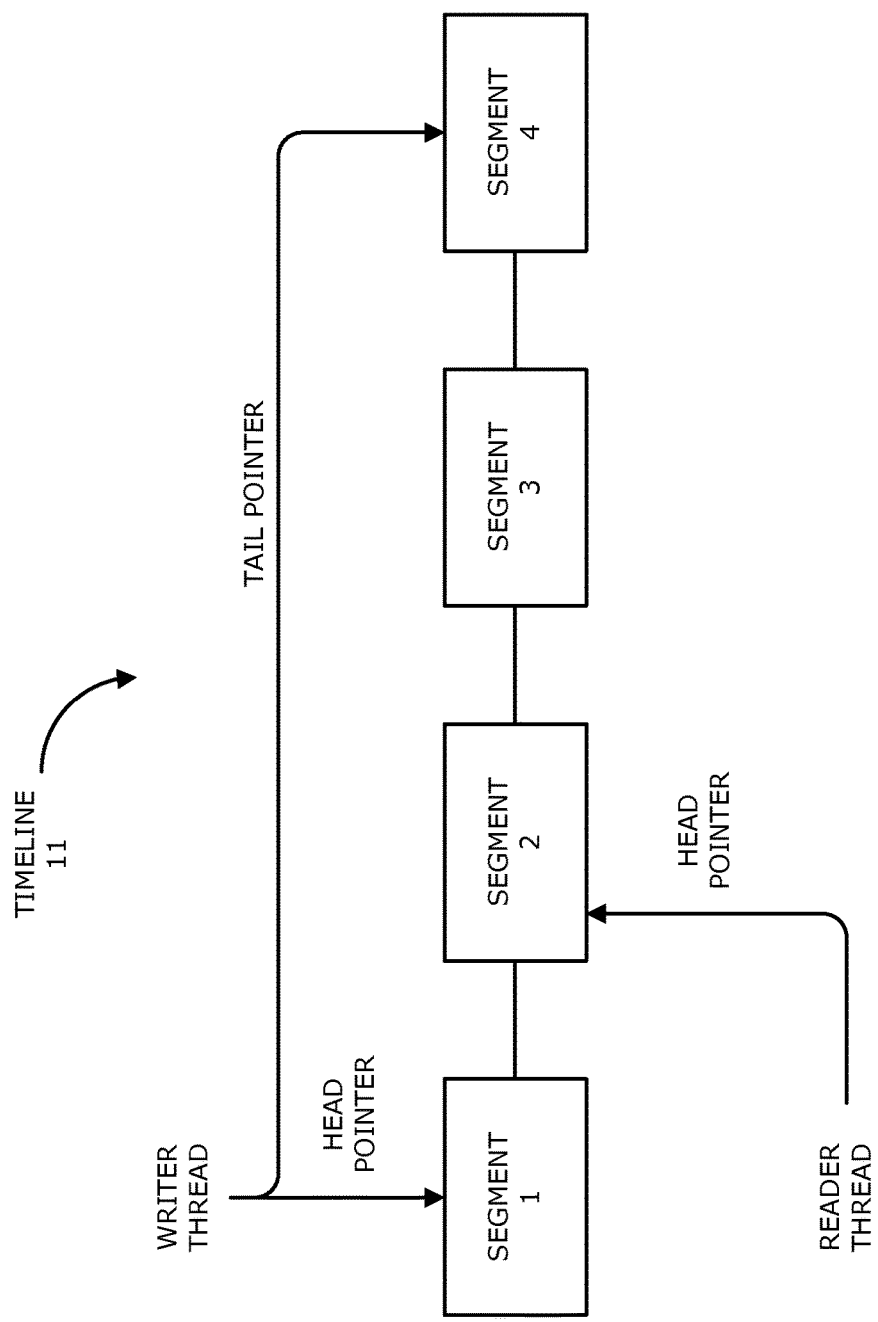
FIG. 3 is a block diagram illustrating the details of the timeline included in the system for improving audio time stretching according to an embodiment of the invention.

Referring back to FIG. 2, in order for the processor 4 (or the time scaling module 9) to generate the output media file 8 based on the input media 2 and the rate schedule 3, the processor 4 uses a timeline 11. The processor 4 may execute a writer thread and a reader thread by executing instructions stored in the memory storage 6. The writer thread may generate a timeline that is a linked list including a plurality of segments as shown in FIGS. 3-4. Each of the segments may represent portions of the input media file 2 and the associated playback output rates delineated in the rate schedule 3. Each of the segments may be a desired playback rate curves. As shown in FIG. 4, each segment includes an input start time and an input end time. For instance, segment 1's input start time and input end time can be found by reading the y-axis at the end point locations of segment 1 (e.g., 0 seconds input start time and y seconds input end time (e.g., where the first horizontal dashed line intersects with the y-axis))

Referring to FIG. 3, a block diagram of the details of the timeline 11 included in the system for improving audio time stretching according to an embodiment of the invention is illustrated. As discussed above, when the writer thread generates the timeline 11, the writer thread writes each segment in the linked list which includes appending a new segment to the end of the linked list during or before playback. Referring to FIG. 3, a newly generated segment may be appended to the right of the segment 4 during or before playback. In some embodiments, appending the new segment to the end of linked list includes having a reference included in the last segment (e.g., segment 4) that references the memory location of the newly generated segment. As shown in FIG. 3, the writer thread includes a head pointer and a tail pointer. The head pointer of the writer thread may point to the writer thread's view of the first segment in the timeline's linked list. The tail pointer of the writer thread may point to the writer thread's view of the last segment in the timeline's linked list. Accordingly, to append the newly generated segment to the end of the timeline 11, the writer thread may merely add the newly generated segment subsequent (e.g., to the right) to the segment that is pointed to by the writer thread's tail pointer. According to an embodiment of the invention, this appending of the newly generated segment may occur during playback given that the linked list is thread-safe. In some embodiments, the writer thread operates in non-real time. In one embodiment, the writer thread may append the new segments in real time.

In generating new segments, a formulae for translating between times on the input media file 2 (e.g., y-axis) and output media file 8 (e.g., x-axis). In some embodiments, the formulae for translating between times on the input media file 2 (e.g., y-axis) and output media file 8 (e.g., x-axis) is provided to the writer thread or to the processor 4. For instance, the input start time and the input end time as shown on the y-axis are translated to generate the output start time and output end time as shown on the x-axis.

Further, as discussed above, the processor 4 may generate the output media file 8 by using the timeline 11. In order to generate the output media file 8, the processor 4 may perform a time scaling of the media file 2 based on the rate schedule 3.

The time scaling performed by the processor 4 may include executing scaling algorithms such as: variable rate resampling, phase vocoder, waveform similarity overlap-add (WSOLA). The time translation functions may be used on a per sample basis for the variable rate resampling algorithms and may be used to determine the proper location (or time) in the input media for the center point of a window of data to be transformed to the output media time for the phase vocoder algorithms. For the WSOLA, the time translation functions are similarly used to the phase vocoder algorithms but the center point of the window of data represents an ideal center about which the WSOLA algorithm can search for a window that is most similar to the desired waveform.

In one embodiment, performing the time scaling of the media file 2 includes the reader thread identifying a segment in the timeline 11 that corresponds to a desired output. For instance, while the processor 4 or time scaling module 9 is processing or time scaling the data (e.g., audio, video or audio-video) of input media file 2 at time 0 seconds, the reader thread may use the timeline 11 to determine where an output media file 8 at 2 seconds corresponds to in terms of input media 2. In other words, the reader thread may identify a segment in the timeline 11 corresponding to a desired output time (e.g., 2 seconds at the output media file 8). Once the segment is identified, the reader thread may use a formulae for translating between times on the output media file 8 (e.g., x-axis) to the input media file 2 (e.g., y-axis). Specifically, the reader thread may translate the desired output time to the corresponding input time based on the identified segment. In one embodiment, the reader thread uses a formula to translate the time for that given segment. For instance, the reader thread may translate the desired output time to the corresponding input time by using a formula that computes the desired output time based on an integral of the desired playback rate curve represented in the identified segment.

With regards to the writer thread deleting segments, the writer thread may only delete segments that have already been executed or played back by the reader thread. With reference to FIG. 4, the reader thread also includes a head pointer that points to the beginning (or first) segment based on the reader thread's perspective. At render time, once the reader thread finished processing or playing back the segment, the reader thread may advance the head pointer to the next segment in the linked list timeline 11. The reader thread may for instance advance the head pointer to the next segment when the desired output time is no longer covered by the segment that is being pointed to by the reader thread's pointer. In other words, the reader thread may have identify a different segment in the timeline 11 corresponding to the new desired output time. Since the head pointer of the firm is pointing the segment 2, segment 1 has been read and/or played out by the reader thread, the writer thread may delete segment 1. In this manner, the timeline 11 is implemented in a thread safe manner such a writer thread may append the new segments in real time while a reader thread may read the linked list without locking and without possibility of corruption. As discussed above, the timeline 11 performs memory allocation and freeing on the non real time thread (e.g., the writer thread) so that there will be no blocking due to calls to the memory allocator on the real-time thread (e.g., the reader thread) where the time scaling (and audio processing) occurs.

Accordingly, the timeline 11 in FIG. 4 may be a time translation data structure to be used to determine what part of the input needs to be used to produce different part of the output. In some embodiments, a segment may include one rate if throughout the period of time that is covered by the segment, the rate is constant, or a segment may include a beginning rate or an end rate when the rate varies throughout the period of time that is covered by the segment. In some embodiments, each segment include: the input start time, the input end time, the beginning rate, the output start time, the output end time, and the ending rate.

Referring back to FIGS. 1-2, the processor 4 or time scaling module 9 may generate an output media file 8 using the timeline as discussed above. The output media file 8 may be played back by the display device 7 that in internal to the electronic device 10 or may be stored in the memory storage 6 for playback in the future. The output media file 8 may also be transmitted via the communication interface 5 to a display device 7 that is external to the electronic device 10 to be played back.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 5A:
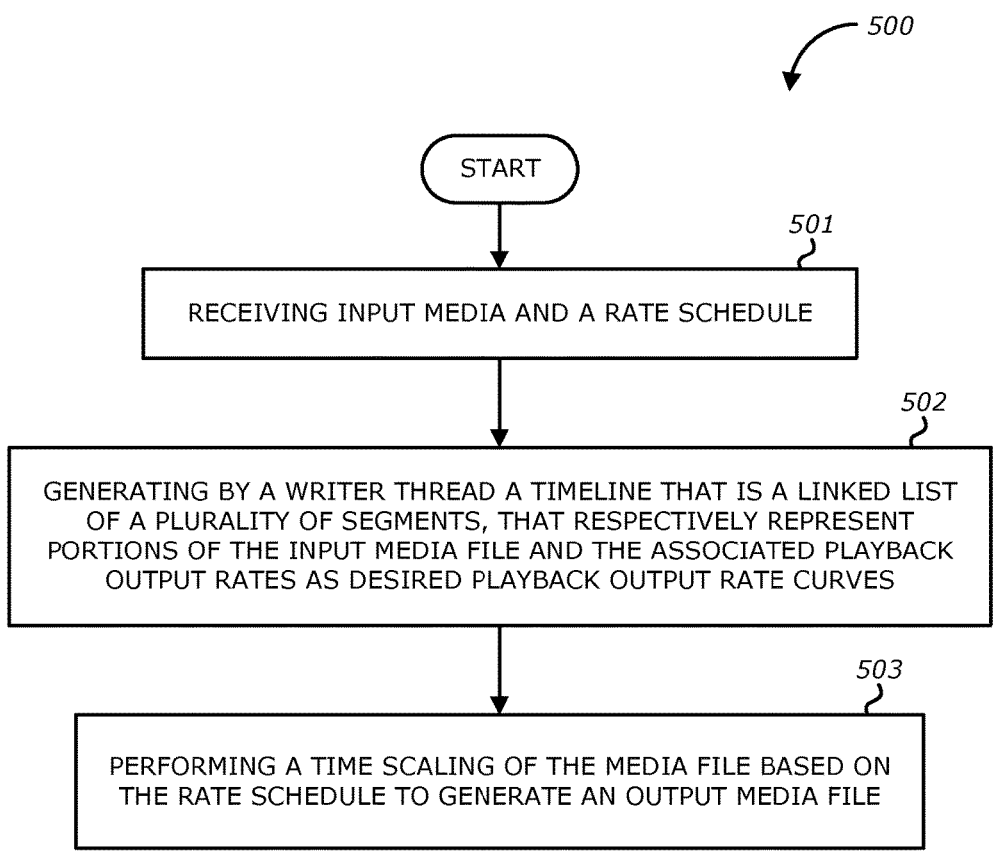
FIGS. 5A-5C illustrate flow diagrams of an example method improving audio time stretching according to an embodiment of the invention.
Figure 5B:
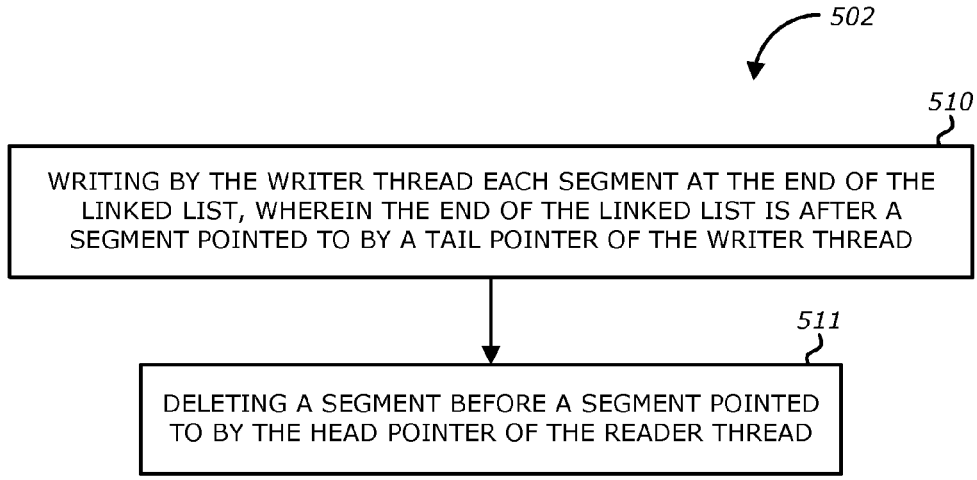
Figure 5C:
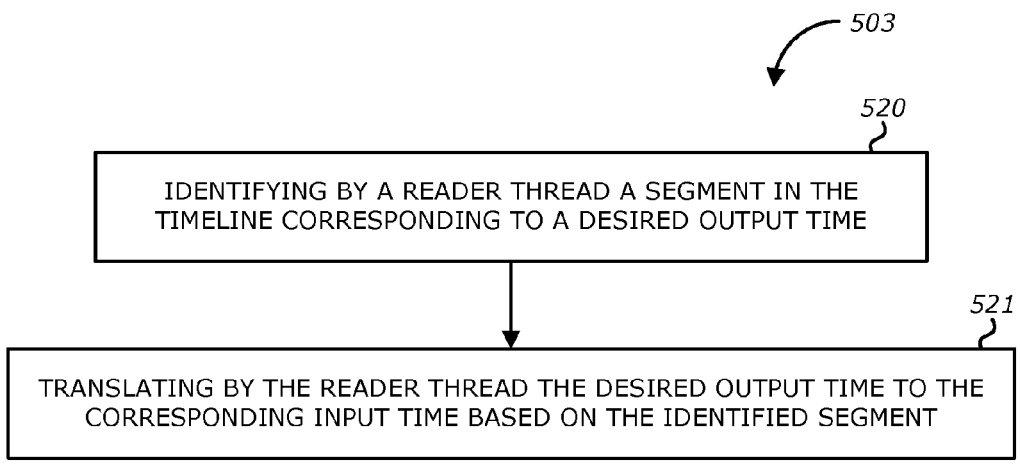

FIGS. 5A-5C illustrate flow diagrams of an example method improving audio time stretching according to an embodiment of the invention.

In FIG. 5A, the method 500 starts with the processor 4 of an electronic device 10 receiving the input media 2 and the rate schedule 3 via the electronic device's communication interface 5 at Block 501. At Block 502, the writer thread generates a timeline 11 that is a linked list of segments respectively representing portions of the input media 2 and the associated playback output rates as desired playback output rate curves (e.g., constant, ramp, exponential, sinusoidal, parabolic, etc.). It is understood that desired playback output rate curve may take on any shaped curve. The timeline 11 thus comprises a series of time segments that describe the time translation between the input side (e.g., upstream side, media side, input media side, etc.) and the output side (e.g., downstream side, presentation side, output media side, etc.). At Block 503, the processor 4 performs a time scaling of the input media file 2 based on the rate schedule to generate an output media file 8.

In FIG. 5B, the details of the generation of the timeline 11 (Block 502) are illustrated according to one embodiment of the invention. At Block 510, the writer thread writes each of the segments at the end of the linked list of the timeline. The end of the linked list may be after a segment that is pointed to by the tail pointer of the writer thread. At Block 511, the writer thread may delete a segment that is before a segment that is pointed to by the head pointer of the reader thread. In this manner the timeline 11 performs all memory allocation and freeing of memory on the non-real time thread (e.g., the writer thread) such that there will be no blocking due to calls to the memory allocator on the real-time thread (e.g., the reader thread) where the time scaling occurs. In other words, the reader thread will thus not have any segments that have not be processed deleted and require further memory allocation during its audio (or audio and video) processing.

In FIG. 5C, the details of the processor 4 performing time scaling of the input media file 2 (Block 503) is illustrated according to one embodiment of the invention. At Block 520, the reader thread identifies a segment in the timeline 11 that corresponds to a desired output time. The reader thread may then, at Block 521, translate the desired output time to the corresponding input time based on the identified segment. The reader thread may use a formula to perform the translation for the identified segment.

Figure 7:
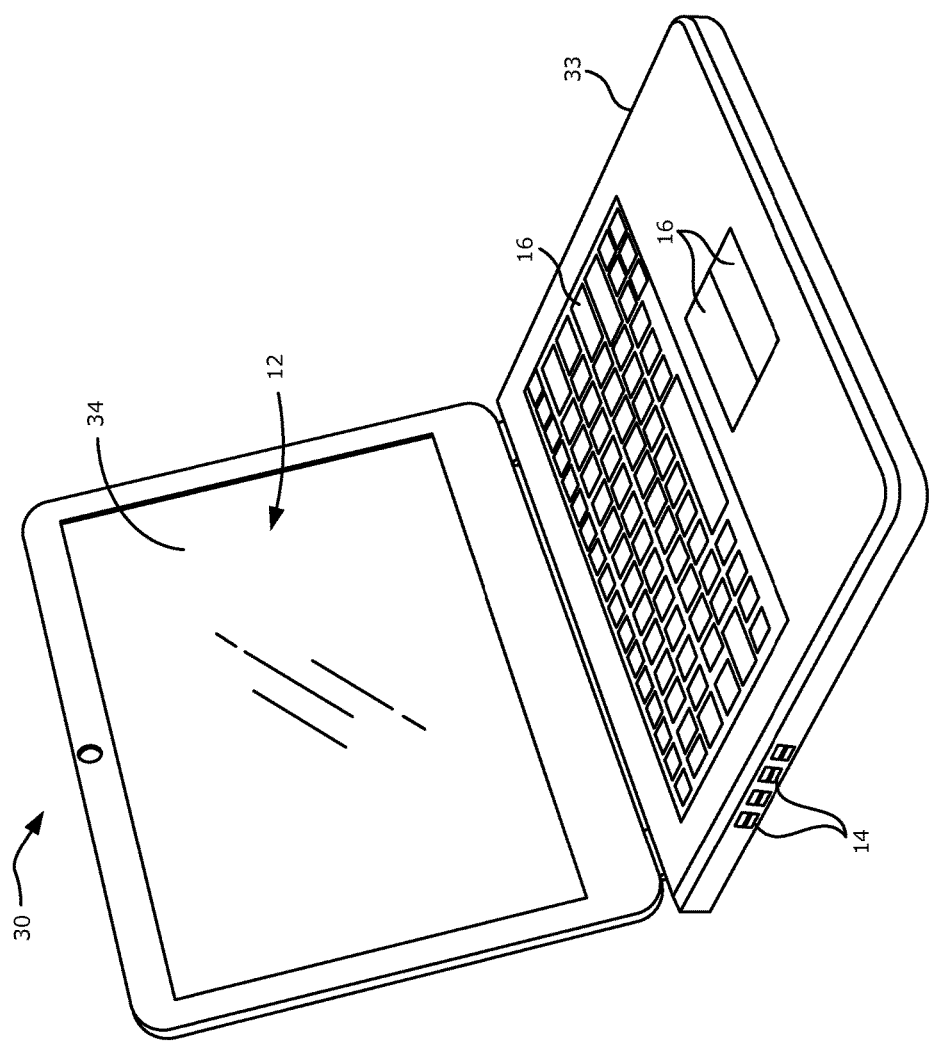
FIG. 7 is a perspective view of an electronic device in the form of a computer, in accordance with aspects of the present disclosure.
Figure 8:
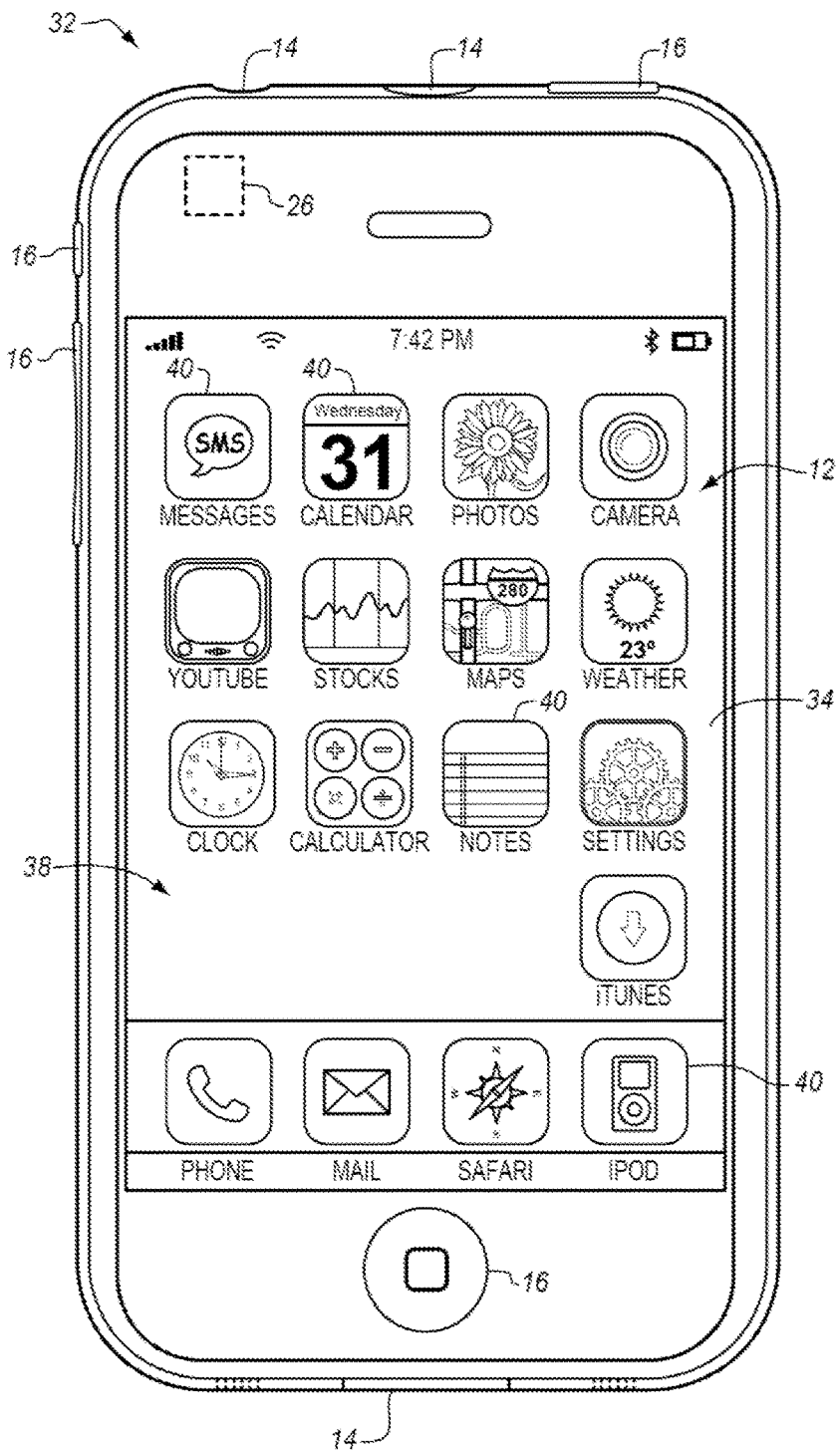
FIG. 8 is a front-view of a portable handheld electronic device, in accordance with aspects of the present disclosure.
Figure 9:
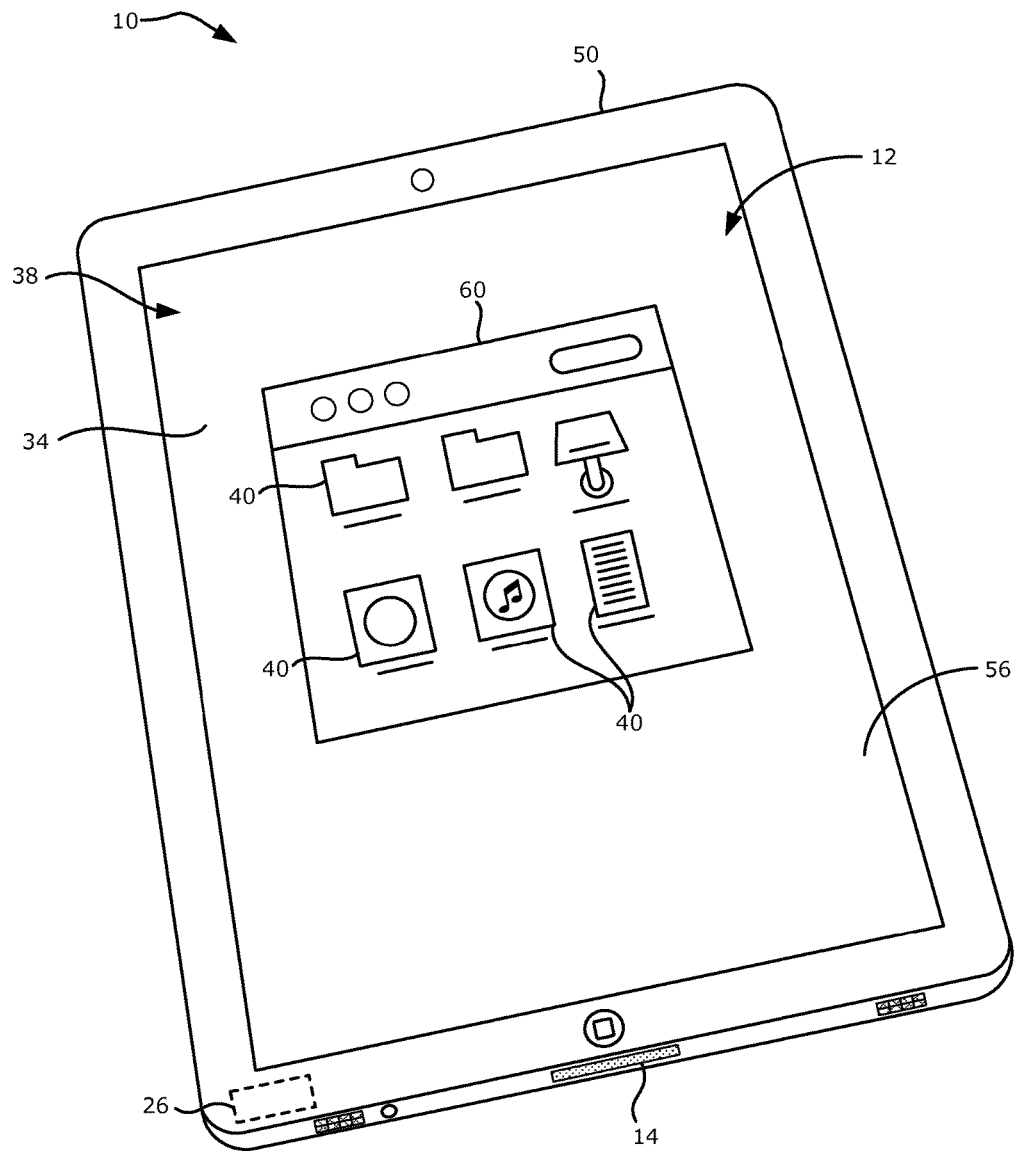
FIG. 9 is a perspective view of a tablet-style electronic device that may be used in conjunction with aspects of the present disclosure.

A general description of suitable electronic devices for performing these functions is provided below with respect to FIGS. 6-9. Specifically, FIG. 6 is a block diagram depicting various components that may be present in electronic devices suitable for use with the present techniques. FIG. 7 depicts an example of a suitable electronic device in the form of a computer. FIG. 8 depicts another example of a suitable electronic device in the form of a handheld portable electronic device. Additionally, FIG. 9 depicts yet another example of a suitable electronic device in the form of a computing device having a tablet-style form factor. These types of electronic devices, as well as other electronic devices providing comparable voice communications capabilities (e.g., VoIP, telephone communications, etc.), may be used in conjunction with the present techniques.

Keeping the above points in mind, FIG. 6 is a block diagram illustrating components that may be present in one such electronic device 10, and which may allow the device 10 to function in accordance with the techniques discussed herein. The various functional blocks shown in FIG. 6 may include hardware elements (including circuitry), software elements (including computer code stored on a computer-readable medium, such as a hard drive or system memory), or a combination of both hardware and software elements. It should be noted that FIG. 6 is merely one example of a particular implementation and is merely intended to illustrate the types of components that may be present in the electronic device 10. For example, in the illustrated embodiment, these components may include a display 12, input/output (I/O) ports 14, input structures 16, one or more processors 18, memory device(s) 20, non-volatile storage 22, expansion card(s) 24, RF circuitry 26, and power source 28.

FIG. 7 illustrates an embodiment of the electronic device 10 in the form of a computer 30. The computer 30 may include computers that are generally portable (such as laptop, notebook, tablet, and handheld computers), as well as computers that are generally used in one place (such as conventional desktop computers, workstations, and servers). In certain embodiments, the electronic device 10 in the form of a computer may be a model of a MacBook™, MacBook™ Pro, MacBook Air™, iMac™, Mac Mini, or Mac Pro™, available from Apple Inc. of Cupertino, Calif. The depicted computer 30 includes a housing or enclosure 33, the display 12 (e.g., as an LCD 34 or some other suitable display), I/O ports 14, and input structures 16.

The electronic device 10 may also take the form of other types of devices, such as mobile telephones, media players, personal data organizers, handheld game platforms, cameras, and/or combinations of such devices. For instance, as generally depicted in FIG. 8, the device 10 may be provided in the form of a handheld electronic device 32 that includes various functionalities (such as the ability to take pictures, make telephone calls, access the Internet, communicate via email, record audio and/or video, listen to music, play games, connect to wireless networks, and so forth). By way of example, the handheld device 32 may be a model of an iPod™, iPod™ Touch, or iPhone™ available from Apple Inc.

In another embodiment, the electronic device 10 may also be provided in the form of a portable multi-function tablet computing device 50, as depicted in FIG. 9. In certain embodiments, the tablet computing device 50 may provide the functionality of media player, a web browser, a cellular phone, a gaming platform, a personal data organizer, and so forth. By way of example, the tablet computing device 50 may be a model of an iPad™ tablet computer, available from Apple Inc.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention claimed is:

1. A method for improving audio time stretching comprising:
    receiving by a processor an input media file and a rate schedule, wherein the rate schedule includes an identification of portions of the input media file and playback output rates associated with each of a plurality of portions of the input media file;
    generating by a writer thread being executed by the processor a timeline that is a linked list including a plurality of segments, wherein the plurality of segments respectively represent the portions of the input media file and the associated playback output rates as desired playback rate curves, wherein each segment includes an input start time and an input end time and a desired playback rate curve, wherein generating the timeline includes:
        writing each segment in the linked list, wherein writing each segment includes appending a new segment to the end of the linked list during playback; and
    performing by the processor a time scaling of the input media file based on the rate schedule to generate an output media file, wherein performing time scaling of the input media file includes:
        identifying by a reader thread being executed by the processor a segment in the timeline corresponding to a desired output time, and
        translating by the reader thread the desired output time to a corresponding input time based on the identified segment, and
    wherein the linked list is implemented as a thread-safe data structure, wherein the writer thread appends new segments to the linked list, while the reader thread reads the linked list, without locking and without corrupting the linked list.

2. The method of claim 1, wherein generating the timeline includes: the writer thread deleting a segment before a segment pointed to by a head pointer of the reader.

3. The method of claim 1, wherein appending the new segment to the end of the linked list includes:
    appending the new segment after a segment pointed to by a tail pointer of the writer thread.

4. The method of claim 1, wherein each segment includes at least one of a beginning rate or an end rate.

5. The method of claim 1, wherein each segment includes: the input start time, the input end time, a beginning rate, an output start time, an output end time, and an ending rate, wherein the input start time and the input end time are translated to generate the output start time and output end time.

6. The method of claim 1, wherein, at render time, a head pointer of the reader thread points to a next segment in the timeline when the desired output time is no longer in the segment that is currently pointed to by the head pointer of the reader thread.

7. The method of claim 1, wherein the desired playback rate curve is one of a ramp, an exponential curve, a constant, a sinusoidal curve, or a parabolic curve.

8. The method of claim 1, wherein the playback output rate is an amount of time of input media file per amount of time of output media file to be played back.

9. The method of claim 1, wherein the writer thread operates in non-real-time and the reader thread operates in real-time.

10. The method of claim 1, wherein performing time scaling of the media file includes:
    displaying the output media file.

11. A system for improving audio time stretching comprising:
    a communication interface to receive an input media file and a rate schedule, wherein the rate schedule includes an identification of portions of the input media file and playback output rates associated with each of a plurality of portions of the input media file;
    a processor;
    a memory storage storing instructions that, when executed by the processor causes the processor to:
        execute a writer thread to generate a timeline that is a linked list including a plurality of segments, wherein the plurality of segments respectively represent the portions of the input media file and the associated playback output rates as desired playback rate curves, wherein each segment includes an input start time and an input end time and a desired playback rate curve, wherein generating the timeline includes:
            writing each segment in the linked list, wherein writing each segment includes appending a new segment to the end of the linked list during playback; and
        perform a time scaling of the input media file based on the rate schedule to generate an output media file, wherein performing time scaling of the input media file includes: executing a reader thread to identify a segment in the timeline corresponding to a desired output time, and to translate the desired output time to a corresponding input time based on the identified segment; and
        wherein the linked list is implemented as a thread-safe data structure, wherein the writer thread appends new segments to the linked list, while the reader thread reads the linked list, without locking and without corrupting the linked list.

12. The system of claim 11, wherein generating the timeline includes: executing the writer thread to delete a segment before a segment pointed to by a head pointer of the reader.

13. The system of claim 11, wherein appending the new segment to the end of the linked list includes:
appending the new segment after a segment pointed to by a tail pointer of the writer thread.

14. The system of claim 11, wherein each segment includes at least one of a beginning rate or an end rate.

15. The system of claim 11, wherein each segment include: the input start time, the input end time, a beginning rate, an output start time, an output end time, and an ending rate, wherein the input start time and the input end time are translated to generate the output start time and output end time.

16. The system of claim 11, wherein, at render time, a head pointer of the reader thread points to a next segment in the timeline when the desired output time is no longer in the segment that is currently pointed to by the head pointer of the reader thread.

17. The system of claim 11, wherein the desired playback rate curve is one of a ramp, an exponential curve, a constant, sinusoidal curve, or parabolic curve.

18. The system of claim 11, wherein the playback output rate is an amount time of input media file per amount of time of output media file to be played back.

19. The system of claim 11, wherein the writer thread operates in non-real-time.

20. The system of claim 11, further comprising:
display device to display the output media file.

21. The system of claim 11, wherein the rate schedule is included in the input media file.

22. A non-transitory storage medium device having stored thereon instructions, when executed by a processor, causes the processor to perform a method for improving audio time stretching comprising:
receiving an input media file and a rate schedule, wherein the rate schedule includes an identification of portions of the input media file and playback output rates associated with each of a plurality of portions of the input media file;
generating by a writer thread executed by the processor a timeline that is a linked list including a plurality of segments, wherein the plurality of segments respectively represent the portions of the input media file and the associated playback output rates as desired playback rate curves, wherein each segment includes an input start time and an input end time and a desired playback rate curve, wherein generating the timeline includes:
writing each segment in the linked list, wherein writing each segment includes appending a new segment to the end of the linked list during playback; and
performing a time scaling of the media file based on the rate schedule to generate an output media file, wherein performing time scaling of the media file includes:
identifying by a reader thread executed by the processor a segment in the timeline corresponding to a desired output time, and
translating by the reader thread the desired output time to a corresponding input time based on the identified segment, wherein translating by the reader thread includes computing the desired output time based on an integral of the desired playback rate curve represented in the identified segment; and
wherein the linked list is implemented as a thread-safe data structure, wherein the writer thread appends new segments to the linked list, while the reader thread reads the linked list, without locking and without corrupting the linked list.

23. The non-transitory storage medium device of claim 22, wherein generating the timeline includes:
the writer thread deleting a segment before a segment pointed to by a head pointer of the reader.

24. The non-transitory storage medium device of claim 22, wherein appending the new segment to the end of the linked list includes:
appending the new segment after a segment pointed to by a tail pointer of the writer thread.

25. The non-transitory storage medium device of claim 22, wherein performing time scaling of the media file includes:
displaying a display device the output.

* * * * *